US006865626B1

United States Patent
Lo et al.

(10) Patent No.: US 6,865,626 B1
(45) Date of Patent: Mar. 8, 2005

(54) UART AUTOMATIC HALF-DUPLEX DIRECTION CONTROL WITH PROGRAMMABLE DELAY

(75) Inventors: Sun Man Lo, San Jose, CA (US); Glenn Wegner, Cupertino, CA (US)

(73) Assignee: Exar Corporation, Fremont, CA (US)

( * ) Notice: Subject to any disclaimer, the term of this patent is extended or adjusted under 35 U.S.C. 154(b) by 0 days.

(21) Appl. No.: 09/527,634

(22) Filed: Mar. 17, 2000

(51) Int. Cl.[7] ............................................... G06F 3/00
(52) U.S. Cl. ............................ 710/52; 710/53; 710/58; 455/73
(58) Field of Search ............................ 710/52, 53, 58; 455/73

(56) References Cited

U.S. PATENT DOCUMENTS

| | | | | |
|---|---|---|---|---|
| 5,140,679 A | * | 8/1992 | Michael ...................... | 710/106 |
| 5,287,458 A | * | 2/1994 | Michael et al. ............... | 710/38 |
| 5,619,544 A | * | 4/1997 | Lewis et al. ................ | 375/377 |
| 5,619,681 A | * | 4/1997 | Benhamida et al. .......... | 703/23 |
| 5,884,099 A | * | 3/1999 | Klingelhofer ................ | 710/52 |
| 5,892,927 A | | 4/1999 | Boehmer et al. | |
| 5,983,017 A | * | 11/1999 | Kemp et al. .................. | 703/13 |
| 6,212,609 B1 | * | 4/2001 | Abramson et al. ........... | 711/162 |
| 6,363,501 B1 | * | 3/2002 | Tobias et al. ................. | 710/8 |
| 6,381,661 B1 | * | 4/2002 | Messerly et al. ........... | 710/305 |
| 6,381,703 B1 | * | 4/2002 | Noh ........................... | 713/503 |
| 6,389,498 B1 | * | 5/2002 | Edwards et al. ............. | 710/260 |

OTHER PUBLICATIONS

Anon, "PC16550D Universal Asynchronous Receiver/Transmitter with FIFOs", Jun. 1995, pp. 1–22, National Semiconductor Corp., USA XP002264776, retrieved from the Internet: www.national.com/ds/PC/PC16550D.pdf.

Anon, "PC16550D Dual Universal Asynchronous Receiver/Transmitter with FIFOs", Jun. 1995, pp. 1–22, National Semiconductor Corp., USA–XP002264777, retrieved from the Internet: www.national.com/ds/PC/PC16552D.pdf.

* cited by examiner

*Primary Examiner*—Jeffrey Gaffin
*Assistant Examiner*—Eron Sorrell
(74) *Attorney, Agent, or Firm*—Townsend and Townsend and Crew LLP

(57) ABSTRACT

A UART with a FIFO buffer is provided. A circuit detects a last word transmitted from the FIFO buffer. A transmitter empty circuit generates a transmitter empty signal (RTS) when the last word transmitted from the FIFO buffer is detected. A delay circuit delays generation of the RTS signal for a programmable time delay. The time delay via a register that is programmable by the user. The invention thus provides the programmable delay on the same chip as the UART.

11 Claims, 2 Drawing Sheets

UART AUTOMATIC HALF-DUPLEX DIRECTION CONTROL WITH PROGRAMMABLE DELAY

BACKGROUND OF THE INVENTION

The present invention relates to universal asynchronous receiver-transmitters (UARTs), and in particular to setting a delay between a last transmission and the reception of data.

UARTs are used in many communications applications to convert data streams from parallel to serial, enabling a serial data stream to communicate with a central processing unit or CPU. UARTs have increased in complexity over the years, with a single UART being able to serve multiple channels.

In operation, a typical FIFO will transmit data until its first-in, first-out (FIFO) transmit buffer is empty. It will then send a control signal indicating it is ready to receive data, the receive transmit signal (RTS). A complication that arises is that the data emptied from the buffer is shifted out onto the serial communication line via a shift register. In addition to the buffer being emptied, time must be allowed for the last word to shift through the shift register.

In addition, an amount of time must be allowed for the transmission time for the last word over the transmission line. This time can vary depending upon the length of the transmission line, its quality, the termination impedance, etc. Accordingly, most communication channels have a built-in delay which allows sufficient delay for a worst case of this combination of events. The delay is typically timed from the TxRDY signal, which is generated from the start bit of the last word. Thus, the delay is from this start bit. Even the word length can vary in some applications, thus this produces another variation in the amount of delay needed.

Some users have desired to customize their applications to shorten this delay where they know they have a short transmission line, good quality, etc. In one known embodiment, this is done by using a programmable logic array (PAL) connected on a board to the UART, with discreet resistors being used to set the delay time. The RTS signal is intercepted, delayed appropriately using the TxRDY signal, and then allowed to proceed after the delay (which is set by the external PAL circuit and discreet resistors). It would be desirable to simplify and improve the accuracy of such a programmable delay.

SUMMARY OF THE INVENTION

The present invention provides a UART with a FIFO buffer. A circuit detects a last word transmitted from the FIFO buffer. A transmitter empty circuit generates an internal transmitter empty signal when the last word transmitted from the FIFO buffer is detected. A delay circuit delays generation of the RTS signal for a programmable time delay from the transmitter empty signal. The time delay is set by a register that is programmable by the user. The invention thus provides the programmable delay on the same chip as the UART.

Preferably, the transmitter empty signal is an internal signal triggered from a stop bit of the last word, rather than the TxRDY signal generated from the start bit. Thus, this will automatically account for variations in word length.

Preferably, the programmable register is a shadow register which is a portion of a read only register used by the user and already in place on the UART. This eliminates the need for adding an additional register. In one embodiment, this is the first four bits of a modem status register.

In still another aspect of a preferred embodiment, the UART supports a plurality of channels. Preferably, at least eight channels are supported. Each channel will have its own FIFO transmit buffer and a circuit for detecting the last word and generating a RTS signal. The delay circuit is common to all of the channels, and can be shared among the multiple channels. Similarly, the programmable register is a single programmable register used for the delay for all the channels. In an alternate embodiment, each channel, or sub-groups of channels could have their separate delay circuit and programmable delay so that a single UART could provide different delays depending upon the different channel transmission line characteristics, as determined by the user.

For a further understanding of the nature and advantages of the invention, reference should be made to the following description taken in conjunction with the accompanying drawings.

DESCRIPTION OF THE SPECIFIC EMBODIMENTS

Figure 1:
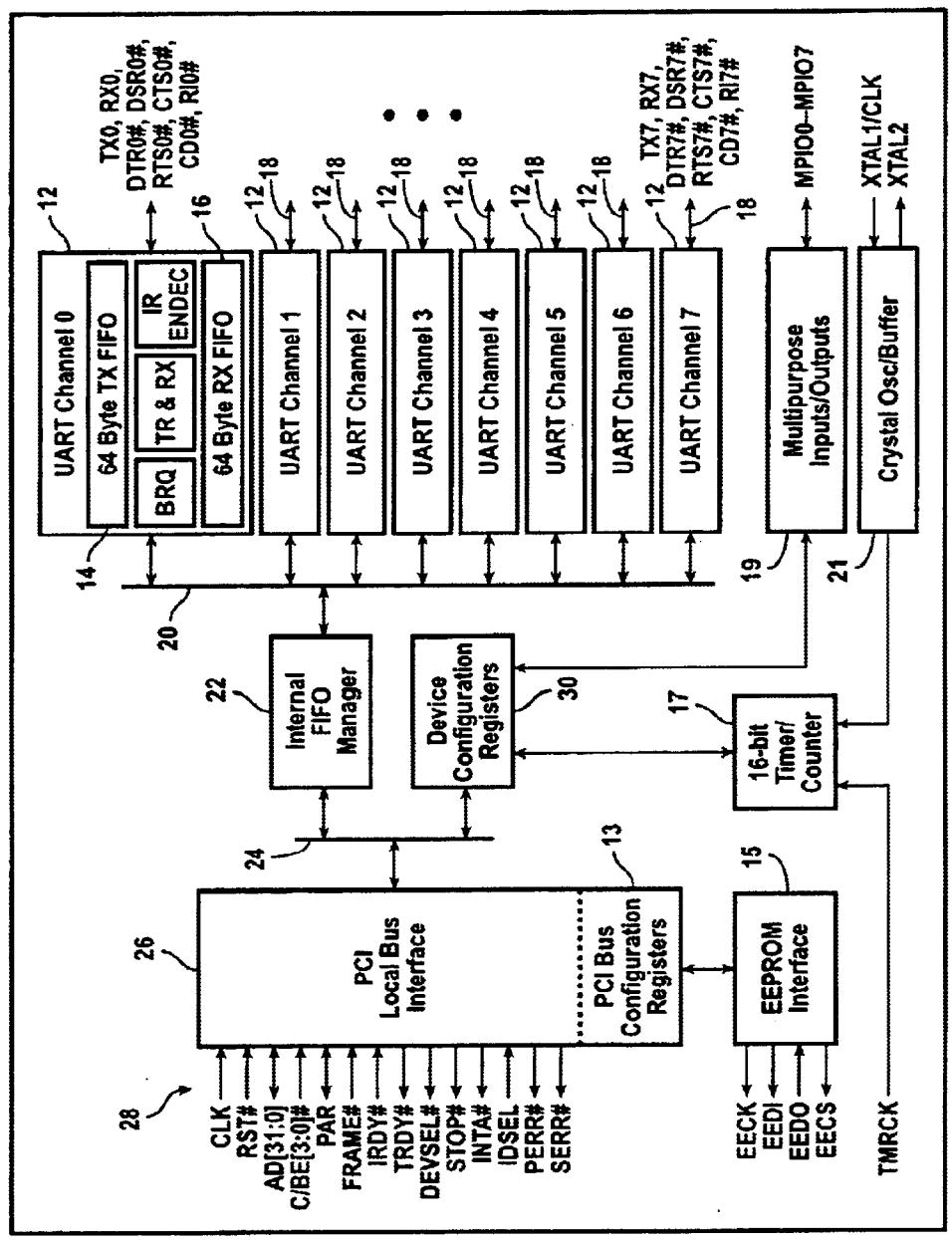
FIG. 1 is a block diagram of a UART incorporating the present invention.

FIG. 1 is a block diagram of a UART 10. The UART includes eight channels 12. Channel 0 indicates the internal circuitry for that channel, which is not shown but would be the same for the other eight channels. In particular, it has a 64-bit transmit first in/first out (FIFO) buffer 14 and a 64-byte receive FIFO 16. The channel also includes other control circuitry and registers. The channels interface via I/O lines 18 to serial data communication lines. The data can be provided through an internal bus 20 to an internal FIFO manager 22. The FIFO manager provides the data in both directions through a second internal bus 24 to a PCI local bus interface 26. This interfaces with a PCI bus 28. FIG. 1 also shows PCI bus configuration registers 13, an EEPROM interface 15, a 16-bit timer/counter 17, multipurpose inputs/outputs 19 and a crystal oscillator/buffer 21.

Directly accessible by the PCI local bus interface 26 are a series of device configuration registers 30.

Figure 2:
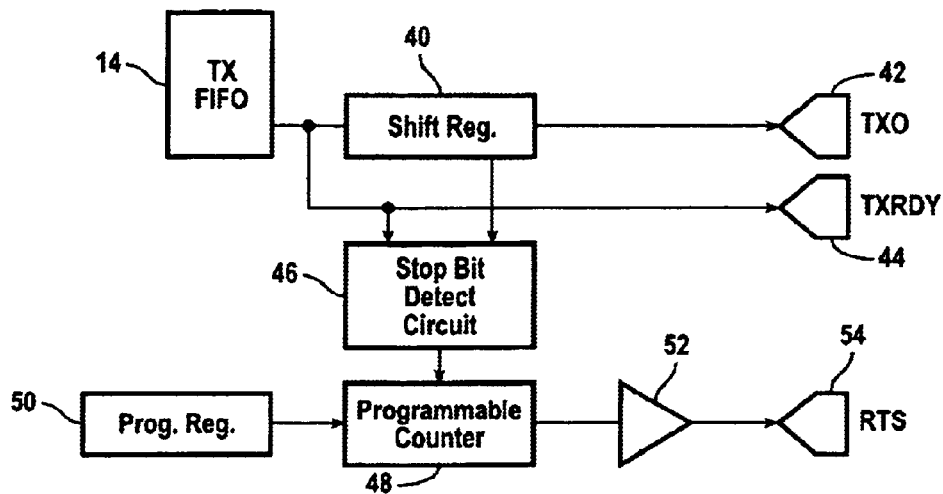
FIG. 2 is a block diagram of the delay circuitry connected to one channel of the UART of FIG. 1.

FIG. 2 is an embodiment of the delay circuitry of the invention for one of the channels of FIG. 1. A transmit FIFO 14 is shown, with the transmitted bits being transmitted through a shift register 40 to the transmit pin (TXO) 42 of the UART. A transmit ready signal (TXRDY) on a pin 44 is generated from the last word in FIFO 14, from the start bit of the word. The present invention adds a stop bit detector circuit 46 which detects the last word from FIFO 14 and also detects the stop bit from shift register 40. When the stop bit is detected, it is provided to a programmable counter 48. The programmable counter counts down the amount of time as set by programmable register 50, which stores the user set programmable delay. When this count is reached, a signal is provided through a buffer 52 to RTS pin 54.

For multiple channels, the programmable register is shared, but the rest of the circuitry is duplicated in each of the channels.

Figure 3:
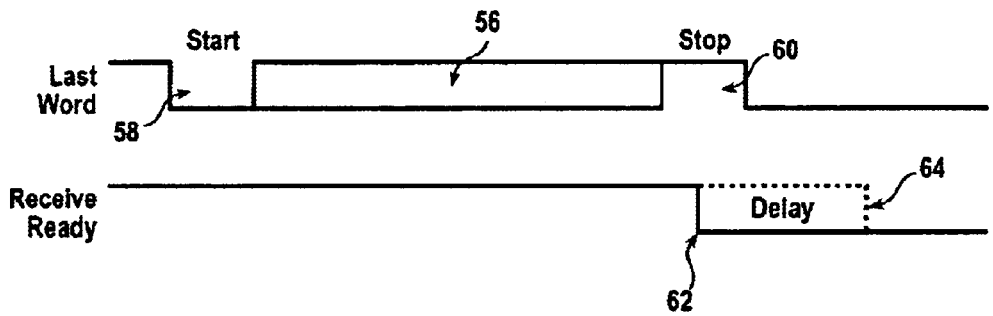
FIG. 3 is a timing diagram illustrating the delay timing in an embodiment of the invention.

FIG. 3 illustrates the timing of the invention. A last word 56 is illustrated having a start bit 58 and a stop bit 60. In existing UARTs, the TXRDY signal is generated from start bit 58. Since the length of last word 56 can vary, existing systems need to account for this possible variation in word length and have the delay appropriately some time after that maximum word length. The present invention, on the other hand, generates a signal which is triggered off the stop bit 60. This signal, designated herein as a transmitter empty signal, is generated at a point 62. The delay circuitry shown in FIG. 2 will delay this until a point 64, with the delay being programmable by the user.

Figure 4:
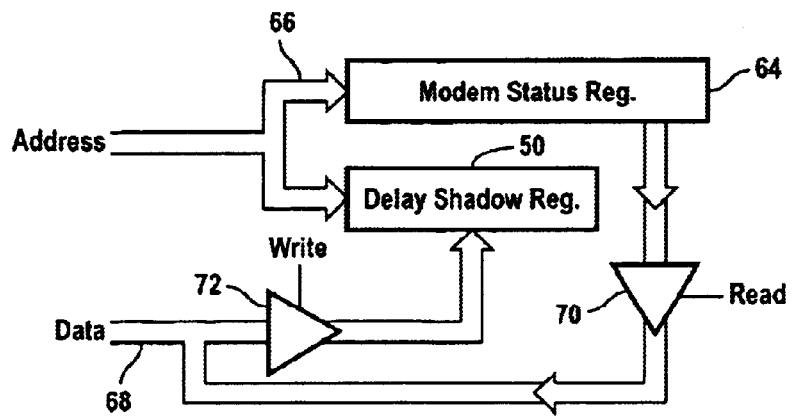
FIG. 4 is a block diagram of the programmable delay register as a shadow register is one embodiment of the invention.

FIG. 4 shows an embodiment of the programmable delay register 50 of FIG. 2 as a delay shadow register. The shadow register is a shadow register to the modem status register 64. As a shadow register, the same address lines 66 address both registers at the same register address. However, the data lines 68 are configured to be read from register 64 through a buffer 70 in response to a read signal. However, a write signal provides the data to shadow register 50 through a buffer 72. Thus, the address space which is only used for reading purposes by the user can also serve, in response to a write by the user, to set the delay. The user does not need to read back the delay signal, so it is simply used as an output internally to the programmable counter of FIG. 2.

The present invention thus allows the user to account for variations in the word length in the FIFO buffer. This word length can vary, for instance, from 7–12 bits in some embodiments. In addition, the user can programmably set the amount of delay appropriate for the particular configuration used by the user. This configuration may vary depending upon the length of the transmission line, the quality of the transmission line, the quality of the termination impedance, the noise environment affecting the signal quality, etc.

As will be understood by those of skill in the art, the present invention can be embodied in other specific forms without departing from the essential characteristics thereof. For example, instead of the delay register and circuitry being shared by multiple channels, a separate delay circuit and register could be used for each subset of four channels. Alternately, each channel could have its own delay register in an alternate embodiment. In addition, alternate register locations could be used. Accordingly, the foregoing description is intended to be illustrative, but not limiting, of the scope of the invention which is set forth in the following claims.

What is claimed is:

1. A universal asynchronous receiver transmitter (UART) comprising:
    a first-in, first-out (FIFO) buffer;
    a shift register coupled to said FIFO buffer;
    a serial transmission line, coupled to said shift register for connecting to a remote processor;
    a circuit for detecting a last word transmitted from said FIFO buffer over said serial transmission line;
    a transmitter empty circuit for generating a control signal, relating to the availability of said serial transmission line to receive data, on a control line when a last word transmitted from said FIFO buffer is detected;
    a delay circuit for delaying generation of said control signal for a programmable delay time; and
    a programmable register for setting said programmable delay time, wherein said programmable register comprises a shadow register which is a write-only register with the same address as a read-only register only read by a user.

2. The UART of claim 1 wherein said control signal is triggered from a stop bit of said last word.

3. The UART of claim 2 wherein said stop bit is detected in said shift register.

4. The UART of claim 1 wherein said write-only register comprises the first four bits of a modem status register.

5. The UART of claim 1 wherein said programmable register is a four bit register.

6. The UART of claim 1 further comprising:
    a plurality of channels, each channel having said FIFO buffer, said circuit for detecting a last word and said transmitter empty circuit; and
    said delay circuit and said programmable register being a single circuit and register connected to control the delay of said control signal for each of said channels.

7. The UART of claim 1 wherein said control signal is an RTS signal.

8. A universal asynchronous receiver transmitter (UART) comprising:
    a first-in, first-out (FIFO) buffer;
    a shift register coupled to said FIFO buffer;
    a serial transmission line, coupled to said shift register for connecting to a remote processor;
    a circuit for detecting a last word transmitted from said shift register over said serial transmission line;
    a transmitter empty circuit for generating an RTS signal on an RTS control line when a last word transmitted from said shift register is detected, wherein said RTS signal is triggered from a stop bit of said last word;
    a delay circuit for delaying generation of said RTS signal for a programmable delay time;
    a programmable register for setting said programmable delay time, wherein said programmable register comprises a shadow register which is a write-only register with the same address as a read-only register only read by a user;
    a plurality of channels, each channel having said FIFO buffer, said circuit for detecting a last word and said transmitter empty circuit; and
    said delay circuit and said programmable register being a single circuit and register connected to control the delay of said RTS signal for each of said channels.

9. The UART of claim 8 wherein said write-only register comprises the first four bits of a modem status register.

10. The UART of claim 8 wherein said programmable register is a four bit register.

11. The UART of claim 8 further comprising at least eight of said channels.

* * * * *